(12) United States Patent
Sasaki et al.

(10) Patent No.: US 7,762,283 B2
(45) Date of Patent: Jul. 27, 2010

(54) COVERING MEMBER AND HEATING DEVICE

(75) Inventors: Akira Sasaki, Tokyo (JP); Yoshiyuki Motoyoshi, Tokyo (JP); Mitsushi Wadasako, Hamamtsu (JP); Daisaku Seki, Hamamatsu (JP); Emico Taguchi, Ikoma-gun (JP)

(73) Assignees: Nichias Corporation, Tokyo (JP); Thermos Corporation, Nara-Ken (JP)

( * ) Notice: Subject to any disclaimer, the term of this patent is extended or adjusted under 35 U.S.C. 154(b) by 1082 days.

(21) Appl. No.: 11/394,184

(22) Filed: Mar. 31, 2006

(65) Prior Publication Data

US 2006/0238986 A1    Oct. 26, 2006

(30) Foreign Application Priority Data

Mar. 31, 2005    (JP) ................. P.2005-102740

(51) Int. Cl.
  *F16L 9/14*    (2006.01)
(52) U.S. Cl. .................. 138/149; 138/33; 138/161; 138/162; 138/166; 138/168
(58) Field of Classification Search ......... 138/33, 138/149, 161, 162, 166, 168
See application file for complete search history.

(56) References Cited

U.S. PATENT DOCUMENTS

| 1,762,276 A | * | 6/1930 | Schreier ................. 138/151 |
| 1,860,203 A | * | 5/1932 | Rishel .................... 138/141 |
| 3,242,948 A | * | 3/1966 | Dunn ..................... 138/166 |
| 3,496,963 A | * | 2/1970 | Bardgette et al. ........... 138/99 |
| 3,955,601 A | * | 5/1976 | Plummer, III ............. 138/149 |
| 4,281,238 A | * | 7/1981 | Noma et al. .............. 219/535 |
| 5,112,661 A | * | 5/1992 | Pendergraft et al. ...... 428/36.91 |
| 5,236,765 A | * | 8/1993 | Cordia et al. ............. 428/192 |
| 5,632,919 A | * | 5/1997 | MacCracken et al. ....... 219/494 |
| 5,714,738 A | * | 2/1998 | Hauschulz et al. ......... 219/535 |
| 5,960,602 A | * | 10/1999 | Goss et al. ................ 52/404.4 |

FOREIGN PATENT DOCUMENTS

| JP | 2000-348850 | 12/2000 |
| JP | 2002-93553 | 3/2002 |

* cited by examiner

*Primary Examiner*—James F Hook
(74) *Attorney, Agent, or Firm*—Nixon & Vanderhye P.C.

(57) ABSTRACT

The present invention provides a covering member including: a surrounding member including a heat insulating material and having a heat generating member or a heat insulating function, the surrounding member being wound from an open state so as to cover an object; and a fixing unit including: an engagement member including: a ring including a heat resistant elastic material; and a hook fitted to the ring; a holding member disposed on one end of the surrounding member, the holding member fastening the ring of the engagement member to hold the engagement member; and a receiving member disposed on one end of the surrounding member so as to correspond to the holding member, the receiving member including a receiving metal fitting to be engaged with the hook of the engagement member.

5 Claims, 3 Drawing Sheets

COVERING MEMBER AND HEATING DEVICE

FIELD OF THE INVENTION

The present invention relates to a covering member or a heating device that is attached to a pipe or the like and is used for heating or keeping heat of the pipe.

BACKGROUND OF THE INVENTION

In various devices or equipments, in order to heat a pipe or keep the heat, the pipe is surrounded by a mat-shaped heating device or a heat insulating material. At that time, in order to keep the surrounding state of the heating device or the heat insulating material, various fixing units are used.

For example, a heating device is known in which plural glass cloth-made belts having fasteners at tips are sewn on the outer surface of a mat-shaped cover member having a built-in heating element, and the glass cloth-made belts are tightened in a state where a pipe is surrounded by the cover member (see reference 1).

[Reference 1] JP-A-10-64667

However, in the heating device of the reference 1, when the attachment and detachment to and from the pipe are repeated, there can occur a case where the glass cloth belt is cut, or the fastener comes off. Additionally, the fitting takes much labor, and the workability is poor.

SUMMARY OF THE INVENTION

The present invention has been made in view of the above circumstances, and has an object to provide a covering member and a heating device, in which the surrounding state of a pipe can be excellently held, and the maintenance cost can be reduced.

The present inventors have made eager investigation to examine the problem. As a result, it has been found that the foregoing objects can be achieved by the following covering member and heating device. With this finding, the present invention is accomplished.

The present invention is mainly directed to the following items:

1. A covering member comprising: a surrounding member comprising a heat insulating material and having a heat generating member or a heat insulating function, the surrounding member being wound from an open state so as to cover an object; and a fixing unit comprising: an engagement member including: a ring comprising a heat resistant elastic material; and a hook fitted to the ring; a holding member disposed on one end of the surrounding member, the holding member fastening the ring of the engagement member to hold the engagement member; and a receiving member disposed on one end of the surrounding member so as to correspond to the holding member, the receiving member including a receiving metal fitting to be engaged with the hook of the engagement member.

2. The covering member according to item 1, wherein the engagement member comprises a half-folded strip-shaped body comprising a heat resistant material, wherein the ring is held at a fold portion of the half-folded strip-shaped body and the hook is fitted to the strip-shaped body.

3. The covering member according to item 1, wherein the holding member is a bag-shaped member having an opening in one end and comprising a heat resistant material, wherein the holding member includes therein a fastener to fasten the ring being inserted through the opening.

4. A heating device comprising: a surrounding member comprising a heat generating member, the surrounding member being wound from an open state so as to cover an object; a heat insulating skin material connected to an outer surface of the surrounding member; and a fixing unit attached to an outer surface of the skin material and holding the surrounding material in a surrounding state, a fixing unit comprising: an engagement member including: a ring comprising a heat resistant elastic material; and a hook fitted to the ring; a holding member disposed on one end of the surrounding member, the holding member fastening the ring of the engagement member to hold the engagement member; and a receiving member disposed on one end of the surrounding member so as to correspond to the holding member, the receiving member including a receiving metal fitting to be engaged with the hook of the engagement member.

5. The heating device according to item 4, wherein the engagement member comprises a half-folded strip-shaped body comprising a heat resistant material, wherein the ring is held at a fold portion of the half-folded strip-shaped body and the hook is fitted to the strip-shaped body.

6. The heating device according to item 4, wherein the holding member is a bag-shaped member having an opening in one end and comprising a heat resistant material, wherein the holding member includes therein a fastener to fasten the ring being inserted through the opening.

Figure 1:
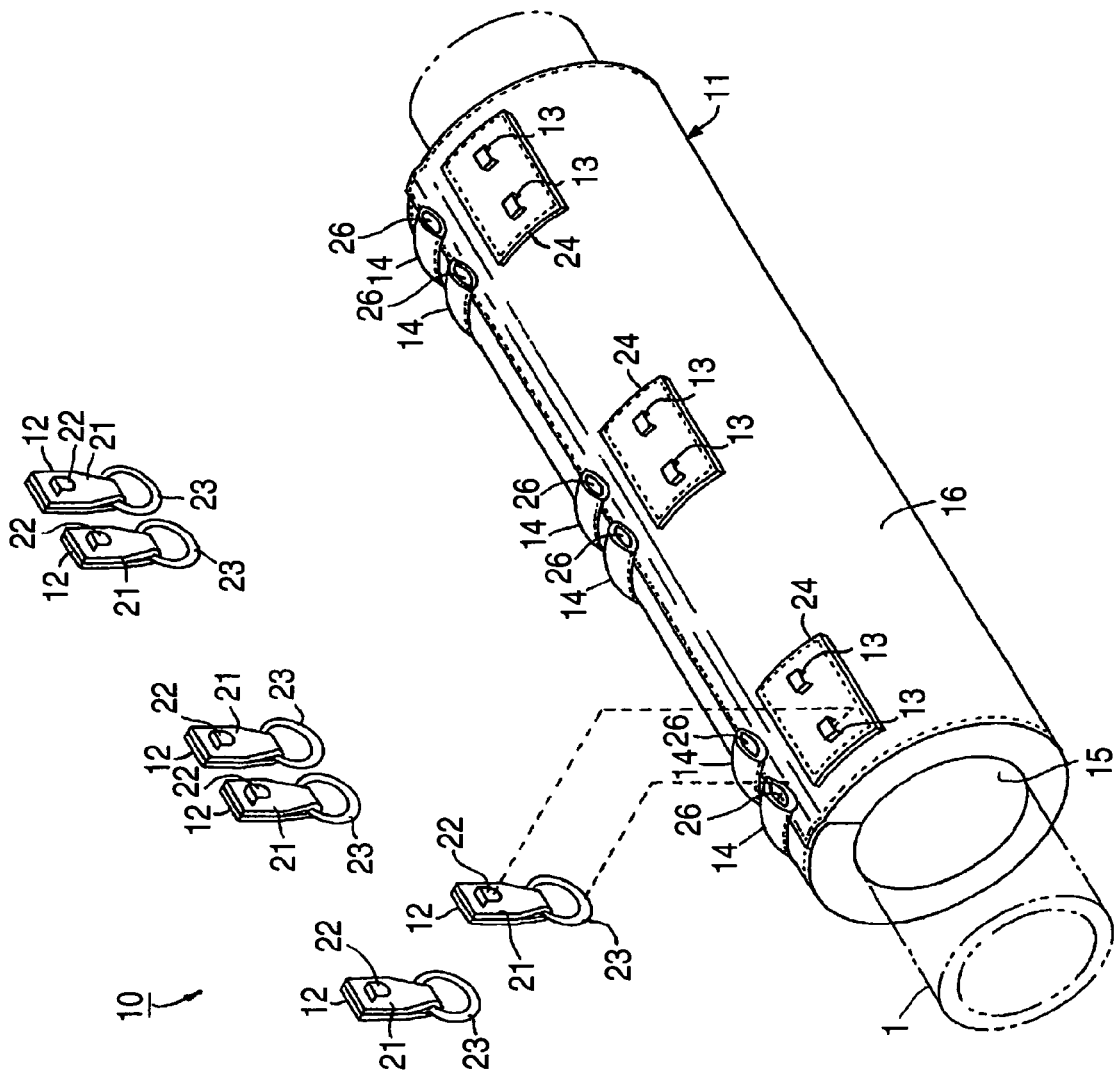
FIG. 1 is an outer appearance perspective view showing an embodiment of a heating device of the invention.

The reference numerals used in the drawings denote the followings, respectively.

1 pipe
10 covering member
11 surrounding body
12 engagement member
13 receiving metal fitting
14 holding member
18 heat generating body
22 hook
23 ring
24 receiving member
25 hook

DESCRIPTION OF EXEMPLARY EMBODIMENTS

A covering member in the present invention comprises a surrounding member and a fixing unit.

The surrounding member comprises a heat insulating material and has a heat generating member or a heat insulating function. The surrounding member is wound from an open state so as to cover an object.

The fixing unit comprises an engagement member, a holding member and a receiving member. The engagement member includes: a ring comprising a heat resistant elastic material; and a hook fitted to the ring. The holding member is disposed on one end of the surrounding member, and the holding member fastens the ring of the engagement member to hold the engagement member. The receiving member is disposed on one end of the surrounding member so as to correspond to the holding member, and the receiving member includes a receiving metal fitting to be engaged with the hook of the engagement member.

A heating device in the present invention comprises a surrounding member, heat insulating skin material and a fixing unit.

The surrounding member comprises a heat generating member. And the surrounding member is wound from an open state so as to cover an object. The heat insulating skin material is connected to an outer surface of the surrounding member. The fixing unit is attached to an outer surface of the skin material and holds the surrounding material in a surrounding state.

The fixing unit comprises an engagement member, a holding member and a receiving member. The engagement member includes: a ring comprising a heat resistant elastic material; and a hook fitted to the ring. The holding member is disposed on one end of the surrounding member, and the holding member fastens the ring of the engagement member to hold the engagement member. The receiving member is disposed on one end of the surrounding member so as to correspond to the holding member, and the receiving member includes a receiving metal fitting to be engaged with the hook of the engagement member.

Figure 2:
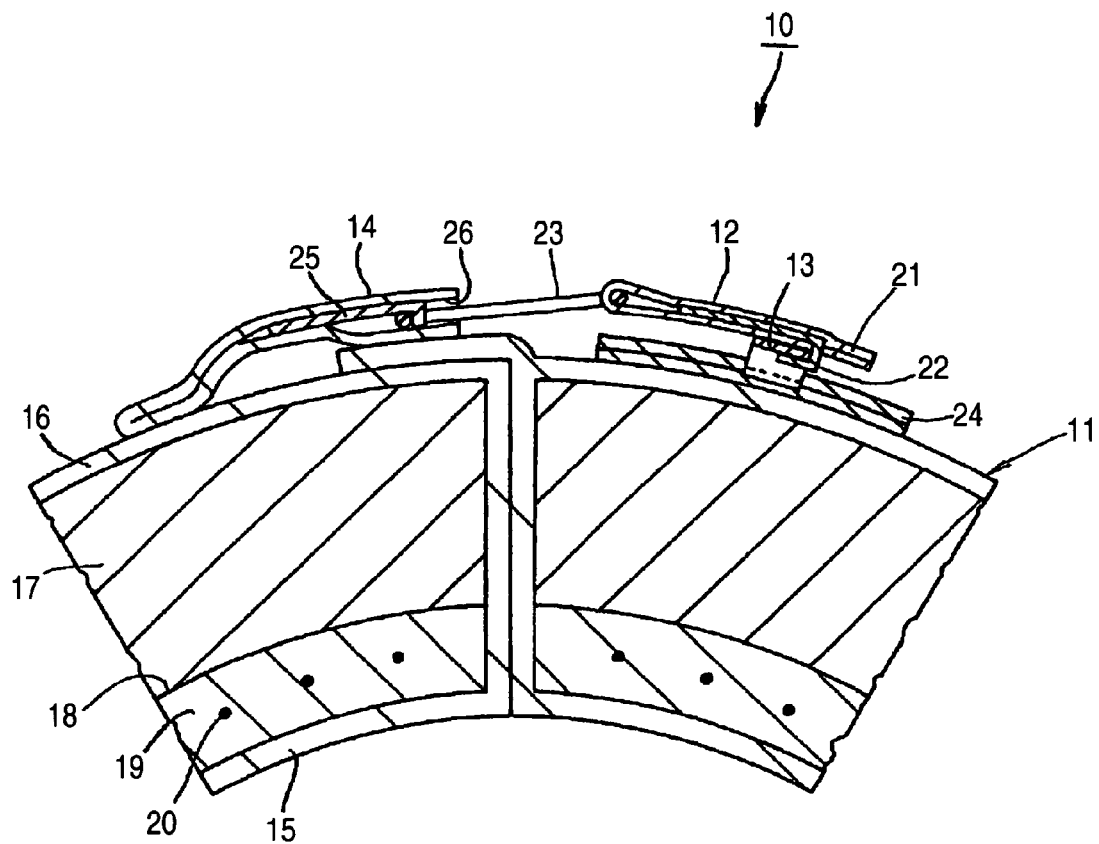
FIG. 2 is a sectional view showing a state in which the heating device shown in FIG. 1 is wound around a pipe.
Figure 3:
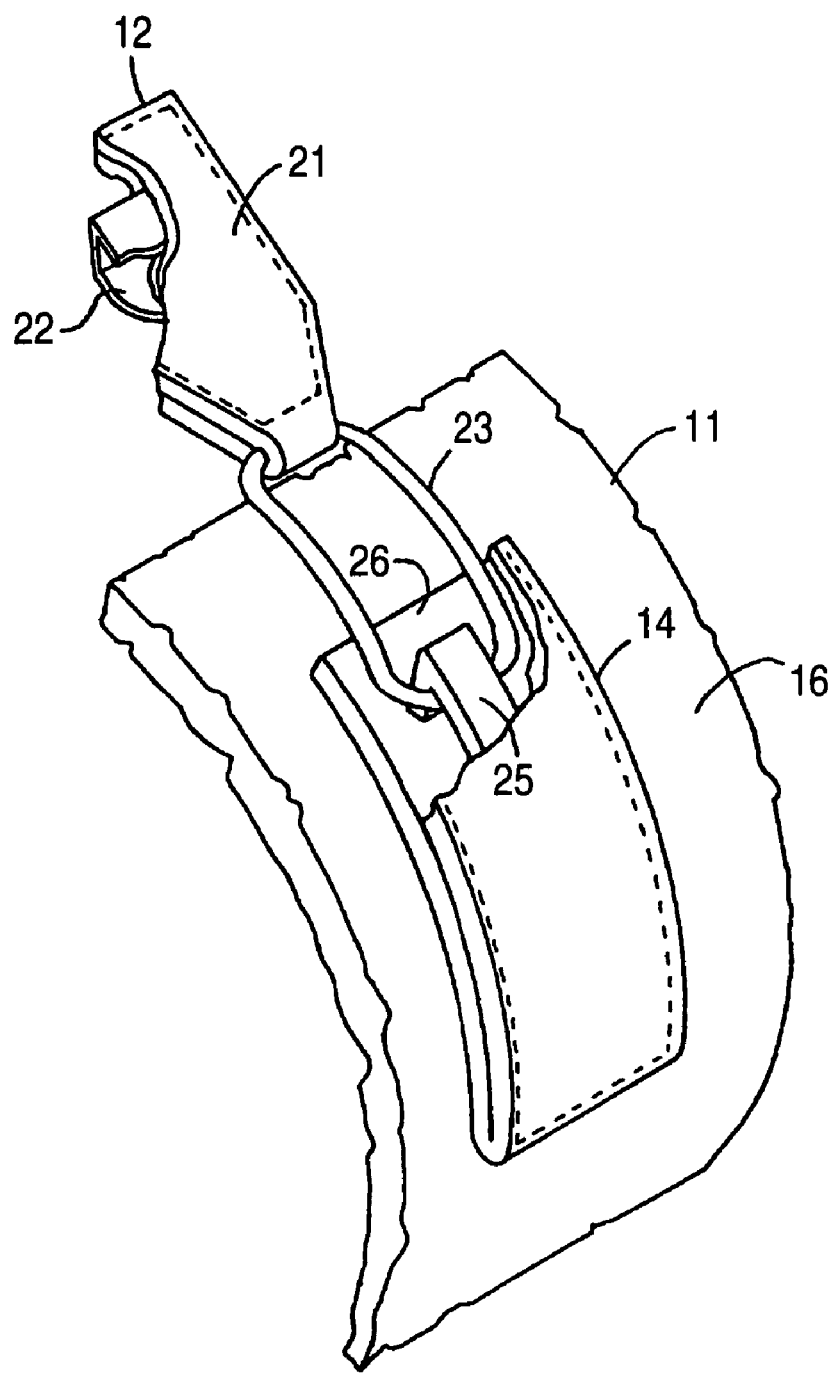
FIG. 3 is a partial cutaway outer appearance perspective view of the periphery of a holding member of the heating device shown in FIG. 1.

In the invention, the engagement member preferably comprises a half-folded strip-shaped body that comprises a heat resistant material. And the ring is preferably held at a fold portion of the half-folded strip-shaped body, and the hook is preferably fitted to the strip-shaped body. Furthermore, the holding member is preferably a bag-shaped member that has an opening in one end and preferably comprises a heat resistant material. And the holding member preferably includes therein a fastener to fasten the ring being inserted through the opening. Hereinafter, preferred embodiments of the invention will be described in detail while a heating device is exemplified. FIG. 1 is an outer appearance perspective view showing an embodiment of a heating device, FIG. 2 is a sectional view showing a state in which the heating device shown in FIG. 1 is wound around a pipe, and FIG. 3 is a partial cutaway outer appearance perspective view of the periphery of a holding member of the heating device shown in FIG. 1.

As shown in the drawings, a heating device 10 of the invention includes an surrounding body 11 having a built-in heating body 18, plural (here, six) holding members 14 provided at one end of the surrounding body 11 and holding engagement members 12, and receiving members 24 including receiving metal fittings 13 and provided correspondingly to the holding members 14.

The surrounding body 11 is a mat-shaped laminated body in which a heat insulating material 17 and the heat generating body 18 are integrally superposed on each other between an interior material 15 and an exterior material 16 sewn to each other. The extended state thereof is substantially rectangular in plane, and the surrounding body is wound into a cylindrical shape so as to cover the outer periphery of a pipe 1 as an object.

The interior material 15 and the exterior material 16 are made of heat resistant resin. Examples thereof include a sheet of a fluorine resin such as PTFE (polytetrafluoroethylene), PFT (tetrafluoroethylene-perfluoroalkoxyethylene copolymer), FEP (tetrafluoroethylene-hexafluoropropylene copolymer), PCTFE (polychlorotrifluoroethylene), ETFE (tetrafluoroethylene-ethylene copolymer), ECTFE (chlorotrifluoroethylene-ethylene copolymer), or PVDF (polyvinylidene fluoride). In addition to these, resin such as polyamide is also used.

The heat insulating member 17 is preferably a non-combustible fire-resistant fiber sheet, and an inorganic fiber sheet or an organic fiber sheet is used. As the inorganic fiber sheet, it is preferable to use one obtained by applying needling to an inorganic fiber material such as glass fiber, ceramic fiber, or silica fiber. As the organic fiber sheet, aramid, polyamid, polyimide or the like is used.

The heat generating body 18 is preferably constructed such that heat generating wires 20, such as insulation coated nichrome wires, are arranged at equal intervals in a heat insulating cloth 19. Since a not-shown lead wire is electrically connected to the heat generating wire 20, electric current supplied from a not-shown controller is given through the lead wire, so that heat is generated to heat the pipe member 1. As the heat generating body 18, in addition to the above, one having a specified shape and a capacity, such as a not-shown sheet-like heat generator, may be used. Incidentally, it is not always necessary that the heat generating body 18 is provided, and in the case where the heat generating body 18 is removed, only the heat insulating member 17 is provided and can be used for keeping the heat in the pipe member 1.

The engagement member 12 includes a grip part 21, a hook 22, and a ring 23 made of an elastic material. Here, the shape of the ring 23 is not limited, and in addition to a circle (O-ring), an ellipse, a prolate ellipsoid or the like may be adopted. However, the O-ring is preferable.

The grip part 21 is such that one strip-shaped heat insulating cloth is folded, and is sewn so that the ring 23 is received in the folded portion so as to be nipped.

The hook 22 is formed of heat resistant metal and is disposed to be sewn in the center of the grip part 21, and its end protrudes from the rear surface of the grip part 21 to form substantially an L shape.

The ring 23 is preferably comprises elastic material having heat resistance, such as fluorocarbon rubber or silicone rubber.

The holding member 14 is a bag-shaped member which is formed by sewing a heat insulating cloth and in which an opening 26 is provided at one end. A portion opposite to the opening 26 is sewed to the exterior material 16 of the surrounding body 11. A metal fitting formed such that a U-shaped slit is provided in a metal plate and a U-shaped tongue part is bent, is sewn and received in the inside of the holding member 14, and a folded part protrudes as a hook 25. The opening 26 of the holding member 14 is disposed toward the other end (receiving member 24 side) of the surrounding body 11.

As shown in FIG. 3, the holding member 14 is constructed such that the ring 23 of the engagement member 12 is inserted into the opening 26, and the ring 23 is fastened to the hook 25 so that the engagement member 12 is held.

The receiving member 24 is sewn to the exterior material 16 at one end of the surrounding body 11, and the receiving metal fitting 13 formed into a substantially C shape is attached to the surface.

An embodiment of the invention, the heating device 10, is constructed as stated above, and in order to attach it to the pipe 1, the surrounding body 11 is wound around the pipe 1, the grip part 21 of each of the engagement members 12 is held and pulled to the receiving member 24 side, and the hook 22 has only to be hooked to the receiving metal fitting 13. The winding state of the surrounding body 11 is excellently kept by the elastic contraction of the ring 23 (see FIG. 2). When the heating device 10 is removed at the time of maintenance or the like, the grip part 21 is held and pulled, and the hook 22 of the engagement member 12 has only to be removed from the receiving metal fitting 13. As stated above, the attachment and detachment of the heating device 10 to and from the pipe 1 can be easily performed.

When the attachment and detachment of the heating device 10 to and from the pipe 1 is repeated, the ring 23 of the engagement member 12 is deteriorated and can be broken. In that case, since the engagement member 12 is a separate member, instead of the engagement member 12 in which the ring 23 was broken, a ring 23 of a new engagement member 12 is inserted into the opening 26 of the engagement member 14 and is hooked to the hook 25, and the attachment may be performed. As compared with the related art in which the whole heating device must be replaced, the maintenance cost is greatly reduced.

Although the invention has been described while the heating device 10 is exemplified, when the surrounding body 11 does not have the built-in heat generating body 18 and is formed of only the heat insulating material, a heat insulating covering member for a pipe can be obtained. At that time, a heating device is separately wound around a pipe, and the heat insulating covering member may be attached so as to cover the heating device.

As described above, according to the covering member and the heating device of the invention, the ring fitted with the hook is constructed of a separate member. Since the member which is broken by repeating the attachment and detachment to and from the pipe is this ring, in the case where the ring is broken, only the ring fitted with the hook has to be replaced. Thus, as compared with the case where the whole heating device is replaced as in the background art, the maintenance cost can be greatly suppressed to be low.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2005-102740 filed on Mar. 31, 2005, and the contents thereof are incorporated herein by reference.

What is claimed is:

1. A covering member comprising:
    a surrounding member comprising a heat insulating material and having a heat generating member or a heat insulating function, the surrounding member being wound from an open state so as to cover an object; and
    a plurality of fixing units, each fixing unit comprising:
    a detachable and separate engagement member including: a ring comprising a heat resistant elastic material; and a hook fitted to the ring;
    a holding member disposed on one end of the surrounding member, the holding member fastening the ring of the engagement member to hold the engagement member; and
    a receiving member disposed on an opposite end of the surrounding member so as to correspond to the holding member, the receiving member including a receiving metal fitting to be engaged with the hook of the engagement member;
    wherein the engagement member comprises a half-folded strip-shaped body comprising a heat resistant material,
    wherein the ring is held at a fold portion of the half-folded strip-shaped body and the hook is fitted to the strip-shaped body.

2. The covering member according to claim 1,
    wherein the holding member is a bag-shaped member having an opening in one end and comprising a heat resistant material,
    wherein the holding member includes therein a fastener to fasten the ring being inserted through the opening.

3. A heating device comprising:
    a surrounding member comprising a heat generating member, the surrounding member being wound from an open state so as to cover an object;
    a heat insulating skin material connected to an outer surface of the surrounding member; and
    a plurality of fixing units attached to an outer surface of the skin material and holding the surrounding material in a surrounding state,
    each fixing unit comprising:
    a detachable and separate engagement member including: a ring comprising a heat resistant elastic material; and a hook fitted to the ring;
    a holding member disposed on one end of the surrounding member, the holding member fastening the ring of the engagement member to hold the engagement member; and
    a receiving member disposed on an opposite end of the surrounding member so as to correspond to the holding member, the receiving member including a receiving metal fitting to be engaged with the hook of the engagement member;
    wherein the engagement member comprises a half-folded strip-shaped body comprising a heat resistant material,
    wherein the ring is held at a fold portion of the half-folded strip-shaped body and the hook is fitted to the strip-shaped body.

4. The heating device according to claim 3,
    wherein the holding member is a bag-shaped member having an opening in one end and comprising a heat resistant material,
    wherein the holding member includes therein a fastener to fasten the ring being inserted through the opening.

5. A covering member comprising:
    a surrounding member comprising a heat insulating material and having a heat generating member or a heat insulating function, the surrounding member being wound from an open state so as to cover an object; and
    a plurality of fixing units, each fixing unit comprising:
    a detachable and separate engagement member including: a ring formed of a heat resistant elastic material secured in a grip part and a first hook secured to the grip part;
    a holding member secured to one end of the surrounding member, the holding member including a second hook that receives the ring of the engagement member; and
    a receiving member secured to an opposite end of the surrounding member so as to correspond to the holding member, the receiving member including a receiving metal fitting that receives the first hook;
    wherein the engagement member comprises a half-folded strip-shaped body comprising a heat resistant material,
    wherein the ring is held at a fold portion of the half-folded strip-shaped body and the hook is fitted to the strip-shaped body.

* * * * *